Figure 6:
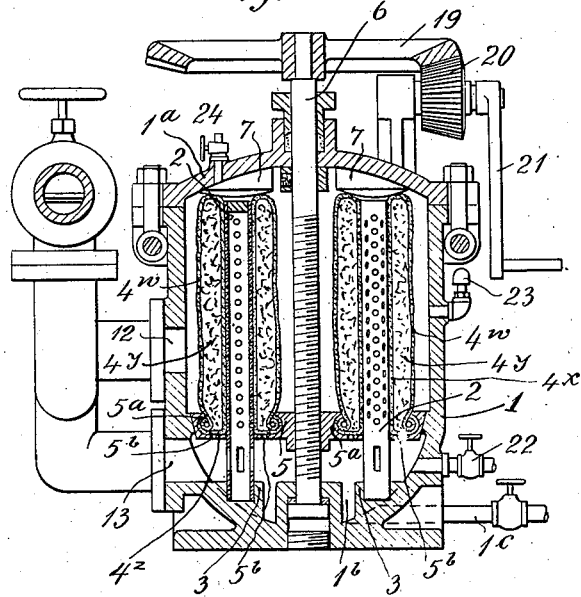

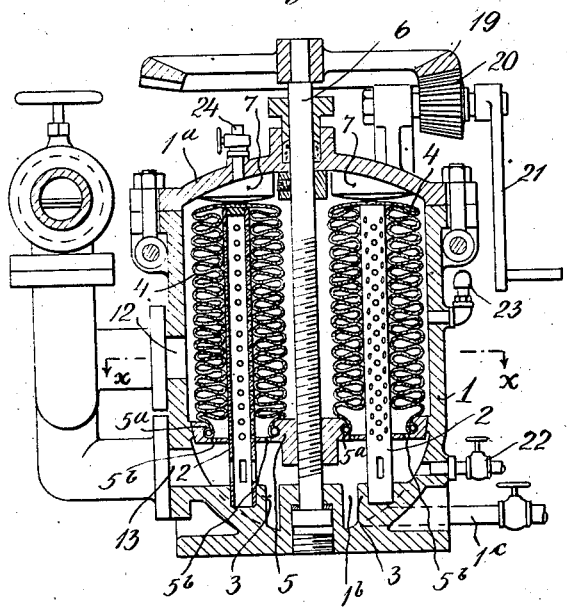

A. E. KRAUSE.
FILTER.
APPLICATION FILED AUG. 26, 1914.

1,145,372.

Patented July 6, 1915.
2 SHEETS—SHEET 2.

Witnesses:
Max B. A. Doring
D. Adams

Inventor
Arthur E. Krause
By his Attorneys
Marble + Matty

UNITED STATES PATENT OFFICE.

ARTHUR E. KRAUSE, OF JERSEY CITY, NEW JERSEY.

FILTER.

1,145,372.  Specification of Letters Patent.  Patented July 6, 1915.

Application filed August 26, 1914. Serial No. 858,641.

*To all whom it may concern:*

Be it known that I, ARTHUR E. KRAUSE, a citizen of the United States of America, and a resident of Jersey City, in the county of Hudson and State of New Jersey, have invented certain new and useful Improvements in Filters, of which the following is a specification.

My invention relates to improvements in filters, particularly bag filters designed for the separation of one liquid from another, for example, the separation of oil or grease from water carrying such oil or grease. The water of condensation of steam power plants commonly carries oil and grease derived from the lubricant used in the engine cylinders of the power plant, which oil or grease should be separated from the water before that water is reused in the boiler, or for ice making, or other purposes; and the improved filter herein described is particularly intended for the extraction of oil or grease from such water of condensation.

Heretofore, bag filters have been used for separating such water of condensation from oil or grease carried thereby; the filter bags become clogged with oil and grease in a short time, and, as such filters have been constructed heretofore, the bags, when so clogged, must be removed for cleaning every few hours.

By the invention herein described I provide means for squeezing a large part of the oil or grease from the bags, without removal of the bags from the filter, and so make it possible to use these bags for a comparatively long time before their removal from the filter for cleaning is necessary.

My invention consists in novel means for squeezing the filter bags and thereby freeing them of the greater part of their contained oil and grease, without removal of such bags from the filter; and in various other features, as hereinafter described and pointed out in the appended claims.

The objects of my invention are, to free filter bags, while in place within the filter, of a large portion of the oil and grease carried by them; to extend very greatly the period during which the filter bags may be retained within the filter, before removal of such bags for cleaning is required; to provide simple and easily operated means for efficiently squeezing the bags, and for returning them, after squeezing, to operative condition; to save as great a proportion as possible of the oil and grease, removed from the bags, and generally to make the filter simple, compact and of large capacity in proportion to its size.

I will now proceed to describe my invention with reference to the accompanying drawings, and will then point out the novel features in claims.

Figure 7:
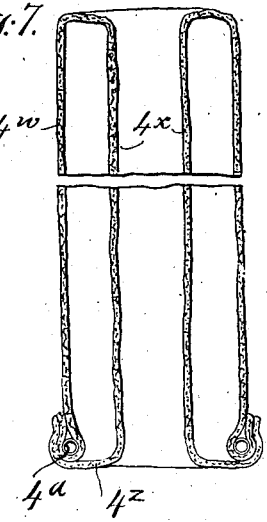

In the drawings: Figure 1 shows a central vertical section through the filter casing and contained parts, the exterior piping being shown in elevation. Fig. 2 shows a vertical section through the exterior piping, the section being taken on a plane at right angles to that of Fig. 1. Fig. 3 shows a transverse horizontal section of the filter taken on the line $x$—$x$ of Fig. 1. Fig. 4 shows an elevation of one of the filter bag tubes. Fig. 5 shows an elevation and partial vertical section of one of the filter bags. Fig. 6 is a view similar to Fig. 1, but illustrates the use, in a filter such as shown in Fig. 1, of filtering material comprising bags or similar flexible envelops containing sponge or other compressible filtering material. Fig. 7 shows, on a larger scale than the preceding figure, a vertical section of one of the filter bags employed in the construction of Fig. 6.

Referring first to Figs. 1 to 5 inclusive: In the drawings 1 designates the casing of the filter, such casing being usually provided with a removable top 1ª. 2 designates the filter tubes, which have perforations as hereinafter described. These tubes are set, at their lower ends, in suitable recesses formed in bosses 3 provided in the lower portion of the filter casing 1. 4 designates the filter bags, which are customarily of some suitable porous fabric, such as Turkish toweling, though other fabric, well known to those skilled in the art, may be used. Preferably, the filter bags are of such length, with reference to the space provided for them within the casing 1, that said bags are crumpled as indicated in Fig. 1, so exposing a very large area of the filtering surface in proportion to the space occupied. 5 designates a plate mounted upon the vertical screw shaft 6 and arranged to be moved up and down within casing 1 by means of that screw shaft. This plate is provided with suitable recesses 5ª to receive the lower ends of the filter bags and is also provided with suitable openings for the passage through such openings of the filter tubes 2. The lower ends of the filter bags are provided with means for holding the lower ends of such bags to such plates, the particular means shown being expanding spring rings 4ª (Fig. 5) included within the hems at the bottoms of such bags, which spring rings engage shoulders of the plate 5 (such shoulders being formed, in the construction shown, by undercut extensions of the recesses 5ª).

The construction is such, as will be seen, that by turning the screw shaft 6 in the proper direction, the plate 5 is moved upward, compressing the filter bags against bosses 7 formed on the under side of the top plate 1ª, the compression thus exerted upon the bags serving to squeeze out of them the greater portion of the oil and grease carried thereby. The filter bag tubes 2 are provided with perforations 2ª through which oil squeezed out of the bags toward the center may pass into such tubes and down through them and thence out through slots 2ᵇ into the oil well 1ᵇ formed in the lower portion of the casing 1; and an escape duct 1ᶜ is provided in the casing 1, through which the oil so collected in the bottom of the casing may be thrown off from time to time. Other oil, pressed outward from the filter bags, will flow down along the outside of such bags, and around the outside of the plate 5 into the oil well; and still other oil, which may reach the recesses 5ª of plate 5, will escape through openings 5ᵇ provided in said plate and so will reach the oil well.

To further facilitate the downward flow of the oil, and to increase the effective area of filtering surface, the tubes 2 are provided with longitudinal scores or grooves 2ᶜ (Fig. 4).

When the bags have been compressed sufficiently, by rotation of the screw shaft 6 in the reverse direction the plate 5 is lowered to its original position, and owing to the engagement of the lower ends of the bags with the shoulders of plate 5, downward motion of said plate drags down the filter bags so that when such plate is seated against the seat 1ᵈ the bags are in the condition shown in Fig. 1.

In the normal filtering operation of the filter, water to be filtered enters at 10 (Fig. 2) and passes downward through duct 11 into the inlet 12 and thence through the filter bags into the filter bag tubes 2 and thence out through the water discharge connection 13 and duct 14 (Fig. 2) to the outlet 15. A by-pass passage 16, is provided for connecting 10 and 15, together with valves 17 and 18. In the upper position of these valves 17 and 18, the by-pass 16 is closed at both ends; while in the lower position of such valves 17 and 18 ducts 11 and 14 are closed by said valves, the by-pass 16 being open. In normal filtering operation the by-pass will be closed, the water or other liquid to be filtered passing through the filter as just previously described, but when it is desired to squeeze the filter bags the valves 17 and 18 will customarily be operated to close ducts 11 and 14 and to open the by-pass, preparatory to raising the compression plate 5; and after such compression plate 5 is lowered again, the by-pass will be closed, and the ducts 11 and 14 opened.

For convenience in rotating the screw shaft 6 I have provided a bevel gear 19 with which intermeshes a bevel pinion 20 provided with a crank arm 21 by which it may be rotated.

The bosses 7 of the top plate 1ª are customarily of slightly spherical contour on their lower faces as indicated in Fig. 1, this construction being preferred in order that there may be no adhesion of the tops of filter bags to these bosses, and also to make the compression of the bags when said bags are pressed between the plate 5 and the bosses 7, greater near the center of such bags than at the outside, so that the oil or grease held by the bags may be forced outward. If desired, a connection 22 may be provided through which steam may be introduced into the filter to heat the bags during the pressing operation and so to increase the fluidity of the oil and grease carried by such bags. In such case, the casing is preferably provided with a safety valve 23.

At some suitable point in the casing (in the construction shown, in the top plate 1ª of the casing) a valved air and oil vent 24 is provided. This vent permits the expulsion of air when first filling the filter, and also permits the drawing off of oil which may, from time to time collect on the top of the water in the filter.

The filter bags employed in my improved filter may be filled with some suitable compressible, and, preferably, elastic filtering material, such for example as sponge. This is illustrated in Figs. 6 and 7, wherein the filter shown is of the same general construction as that shown in Figs. 1–5 inclusive, except that the bags, designated in Figs. 6 and 7 by numerals 4ʷ have an internal tubular portion 4ˣ adapted to surround and fit more or less closely over the tubes 2, the spaces between such tubular portions 4ˣ and the outsides of the bags being filled with more or less tightly packed elastic filtering material. Sponge is one such suitable elastic filtering material but I do not limit myself to the use of sponge. 4ʸ designates this filling or elastic filtering material. The internal tubular portion 4ˣ of each filter bag is preferably provided at its lower end with a flap 4ᶻ extending to the outside of the bag, whereby it is held to the plate 5 by the same spring ring which holds the outside of the bag to the plate 5.

The operation of this filter is precisely the same as that of the filter shown in Figs. 1–5 inclusive, except that the bags containing elastic absorbent filtering material will naturally have a much greater capacity for oil absorption than will the bags shown in Figs. 1–5 inclusive. In squeezing the oil or grease out of the bags shown in Figs. 6 and 7, the operation is precisely the same as that described with reference to the construction of Figs. 1–5 inclusive, except that the plate 5, in moving upward, compresses, not only the bags themselves but also the compressible and elastic filtering material 4ʸ within such bags. When the plate 5 is lowered again the bags will be drawn out as in the construction shown in Figs. 1–5 inclusive, and the filtering material 4ʸ within the bags will expand because of its elastic nature.

I do not limit myself to the use of filter bags composed of vegetable or animal fiber, particularly in the case of the filter shown in Figs. 6 and 7, wherein the main filtering material is the sponge, or other suitable material within the bags, the bags themselves may, in some cases at least, be formed of woven wire material or other material of a non-organic nature.

What I claim is:—

1. A filter comprising in combination a casing, a tubular perforate filter bag support therein, a filter bag mounted upon such support, and means for compressing such bag endwise while in place on such support, and thereby squeezing from such bag more or less liquid material held thereby.

2. A filter comprising a bag of compressible filtering material, a support upon which such bag is mounted, a backing for one end of said bag, a plate engaging the other end of said bag, such plate movable toward and from said backing, and means for so moving such plate; whereby by moving the plate toward the backing such filter bag may be compressed between the plate and backing.

3. A filter comprising a bag of compressible filtering material, a support upon which such bag is mounted, a backing for one end of said bag, a plate engaging and secured to the other end of said bag, such plate movable toward and from said backing, and means for so moving such plate; whereby by moving the plate toward the backing such filter bag may be compressed between the plate and backing, and whereby by reverse movement of such plate the filter bag is extended again.

4. A filter comprising in combination a casing, a plurality of tubular filter bag supports therein, filter bags on said supports, a backing for one end of each such filter bag, a compression plate engaging the other ends of such bags and movable toward and from the said backings, and means for so moving such compression plate; whereby by moving the plate toward the backing such filter bags may be compressed between the plate and backing.

5. A filter comprising in combination a casing, a plurality of tubular filter bag supports therein, filter bags on said supports, a backing for one end of each such filter bag, a compression plate engaging and secured to the other ends of such bags and movable toward and from the said backings, and means for so moving such compression plate; whereby by moving the plate toward the backing such filter bags may be compressed between the plate and the backing, and whereby by reverse movement of such plate the filter bags are extended again.

6. A filter comprising in combination a casing, a plurality of tubular filter bag supports therein, filter bags on said supports, a backing for one end of each such filter bag, a compression plate engaging the other ends of such bags and movable toward and from the said backing, a screw shaft engaging said compression plate and so moving the latter, and means for rotating such screw.

7. A filter comprising a bag of compressible filtering material, a support upon which such bag is mounted, a backing for one end of said bag, a plate engaging the other end of said bag and having a reëntrant recess receiving the other end of such bag, and spring means holding such end of the bag in such reëntrant recess, whereby that end of the bag and the said plate are connected, such plate movable toward and from said backing, and means for so moving said plate.

8. A filter comprising in combination a bag of compressible filtering material, a tubular perforate support for such bag, adapted to fit therewithin and having, within the range of such support to be covered by such bag, perforations adapted to permit the filtrate to flow into such support, such support having also, beyond the range of the support intended to be occupied by the bag, a discharge opening, such support being grooved longitudinally on its exterior through the range of the first mentioned series of perforations of such support; and means for compressing the filter bag while in place on such support.

9. A filtering element comprising a container having an outer collapsible envelop and a central tubular portion, and compressible and elastic filtering material between such tubular portion and the outer envelop.

10. A filter comprising a filtering element having an outer envelop and having also an internal tubular portion, and having elastic and compressible filtering material within the space between such tubular portion and outer envelop, in combination with a support upon which such filtering element is mounted.

11. A filter comprising a filtering element having an outer envelop and having also an internal tubular portion, and having elastic and compressible filtering material within the space between such tubular portion and outer envelop, in combination with a support upon which such filtering element is mounted, and means for compressing such envelop, and its contents, endwise while in place on such support, and thereby squeezing out of the filtering material more or less liquid material held thereby.

12. A filter comprising a filtering element, having an outer collapsible envelop and a central tubular portion and compressible and elastic filtering material between such tubular portion and the outer envelop, in combination with a casing, a tubular perforate filter element support therein, passing through the central tubular portion of such filtering element, the end portion of such tubular portion of the filtering element being secured to such tubular support and means for compressing such filtering element endwise while in place on such support, and thereby squeezing from such filtering element more or less liquid held thereby.

13. A filter comprising a bag of compressible filtering material, a support upon which such bag is mounted, a backing for one end of said bag, a compressing member engaging the other end of said bag, such compressing member movable toward and from said backing, and means for so moving such compressing member whereby by moving such compressing member toward the backing such filter bag may be compressed between the compressing member and backing, the said backing sloping backwardly from its portion nearest the center of the bag, whereby as the bag is pressed against such backing greater pressure is exerted on the central portion of the bag than on the side portions, the liquid held by the bag being thereby pressed outwardly.

14. A filter comprising in combination a tubular perforate filter bag support, a filter bag comprising an outer envelop and an internal tubular portion, the latter fitting over such filter bag support, and means for compressing such bag endwise while in place on such support, and thereby squeezing from such bag more or less liquid material held thereby, such filter bag support having longitudinal grooves, whereby the effective filtering surface of the tubular portion of the bag in contact with said tubular filter bag support is increased, and whereby the flow of the liquid filtered is facilitated.

15. A filtering element comprising an outer envelop and an internal tubular portion, connected at one end to such outer envelop, and having at its other end a flap extending across and substantially closing the other end of such envelop.

16. A filtering element comprising an outer envelop and an internal tubular portion, connected at one end to such outer envelop, and having at its other end a flap extending across and substantially closing the other end of such envelop, and elastic compressible filtering material within the space between such tubular portion and outer envelop.

17. A filter comprising a bag of compressible filtering material, such bag consisting of an outer envelop, and an internal tubular portion, a support upon which such bag is mounted, a backing for one end of said bag, a plate engaging the other end of said bag, and having a reëntrant recess, the said tubular portion of said bag having at one end a flap extending across the end of the envelop and folded around such end, spring means holding both such end of the envelop of the bag and the edge portion of such flap of the bag within such reëntrant recess, whereby the bag is connected to the plate, such plate movable toward and from said backing, and means for so moving said plate.

18. A filter comprising a bag of compressible filtering material, such bag consisting of an outer envelop, and an internal tubular portion, a support upon which such bag is mounted, a backing for one end of said bag, a plate engaging the other end of said bag, and having a reëntrant recess, the said tubular portion of said bag having at one end a flap extending across the end of the envelop and folded around such end, spring means holding both such end of the envelop of the bag and the edge portion of such flap of the bag within such reëntrant recess, whereby the bag is connected to the plate, such plate movable toward and from said backing, and means for so moving said plate, and elastic and compressible filtering material within the bag and between the said tubular portion of the bag and the outer envelop of the bag.

19. A filter comprising a bag of compressible filtering material, a support upon which such bag is mounted, and means included as a part of the filter structure for compressing the material of such bag while in place upon such support and thereby squeezing out of such bag more or less liquid material held thereby.

20. A filter comprising a bag of compressible filtering material, a support upon which such bag is mounted, and means included as a part of the filter structure for compressing the material of such bag endwise while in place upon such support and thereby squeezing out of the bag more or less liquid material held thereby.

21. A filter comprising a bag of compressible filtering material, a support upon which such bag is mounted, and means for compressing such bag endwise while in place on such support, and thereby squeezing out of the bag more or less liquid material held thereby, said means comprising members at the ends of said bag between which the material of said bag can be compressed.

In testimony whereof I have signed this specification in the presence of two subscribing witnesses.

ARTHUR E. KRAUSE.

Witnesses:
CHARLES E. RYND,
H. M. MARBLE.